United States Patent
Lee et al.

(10) Patent No.: US 6,721,070 B1
(45) Date of Patent: Apr. 13, 2004

(54) APPARATUS AND METHOD FOR COUNTING PIXELS IN PRINT DATA

(75) Inventors: R. Samuel Lee, Meridian, ID (US); Roger G. Markham, Webster, NY (US)

(73) Assignees: Xerox Corporation, Stamford, CT (US); In-System Design, Inc., Boise, ID (US)

(*) Notice: Subject to any disclaimer, the term of this patent is extended or adjusted under 35 U.S.C. 154(b) by 0 days.

(21) Appl. No.: 09/433,941

(22) Filed: Nov. 4, 1999

(51) Int. Cl.[7] .............................................. G06F 12/00
(52) U.S. Cl. .................. 358/426.04; 382/192; 382/194; 382/309
(58) Field of Search ................................. 382/194, 192, 382/309; 358/426.01–426.09

(56) References Cited

U.S. PATENT DOCUMENTS

| | | | |
|---|---|---|---|
| 5,287,452 A | * | 2/1994 | Newman ..................... 345/520 |
| 5,729,351 A | * | 3/1998 | Oh ............................... 358/296 |
| 5,818,607 A | * | 10/1998 | Nakamura et al. ..... 358/426.05 |
| 6,145,947 A | * | 11/2000 | Inora et al. ....................... 347/7 |

* cited by examiner

*Primary Examiner*—Edward Coles
*Assistant Examiner*—Alan Rahimi
(74) *Attorney, Agent, or Firm*—Oliff & Berridge, PLC

(57) ABSTRACT

An independent hardware pixel counter counts bits of print data in regions of interest. The independent pixel counter can be an application specific integrated circuit (ASIC), and is separate from a control processor. The independent hardware pixel counter selectively monitors a data bus carrying image data to or from a memory. Once the pixels of the image data have been counted, the count data can be sent to the control processor in order to implement a print strategy. The pixel counter counts the print data at a point when image data is being sent to the memory, since at that point the image data is both uncompressed and in a raster format, and thus can be easily analyzed. Additionally, because the image data is stored in the memory until enough print data has accumulated for printing, the processor is provided with sufficient time to gather and use print information before the counted image data is printed.

14 Claims, 7 Drawing Sheets

APPARATUS AND METHOD FOR COUNTING PIXELS IN PRINT DATA

BACKGROUND OF THE INVENTION

1. Field of Invention

This invention is directed to apparatus and methods for counting bits contained within print data prior to a printer using the print data to form an image.

2. Description of Related Art

Currently, limited processor and memory bandwidths limit the usefulness of low-cost printers, which need to handle large amounts of data to create high quality images. For example, color images today are generally printed at 600 spi or greater. Accordingly, to reduce to the loads on both processing and memory resources, acquiring information about the image to be printed before printing occurs is useful.

For example, in thermal and ink jet printing, knowing where large areas of heavy ink coverage exist in an image prior to printing is extremely valuable. This information can be used to choose a print mode, a print speed, a drying time, or the like. Additionally, it may also be important to know where printing does not occur, so that a print head may skip the corresponding area, and thereby reduce loads on both processing and memory resources.

SUMMARY OF THE INVENTION

Gathering information about a print image prior to printing is a very processor-intensive operation. Additionally, choosing a point within the flow of the print data to gather the image information can require redundant shifting of data within the memory. One technique to gather the information is to count the bits as the print data is supplied to the print head. However, once the print data is at the print head, controlling the printing characteristics based on the image information is impossible because the print data is already being printed. Another technique counts the bits as the print data is supplied to the printer from a print data source. However, as the print data is supplied, the raw data stream generated by the print source generally has commands embedded within that are not readily extractable. This raw data stream is also often in a compressed and/or encrypted format.

This invention provides systems and methods for counting bits of print data in regions of interest using an independent hardware pixel counter, such as an application specific integrated circuit (ASIC), that is separate from the control processor, to selectively monitor a data bus carrying image data to or from a memory. Once the pixels of the image data have been counted, the count data can be sent to the processor in order to implement a print strategy.

The systems and methods according to this invention take advantage of the fact that at a point when image data is being sent to the memory, the image data is both uncompressed and in a raster format, and thus can be easily analyzed. Additionally, in systems and methods according to this invention, the image data is stored in the memory until enough print data has accumulated for printing, which provides sufficient time to gather and use print information before the actual printing occurs.

These and other features and advantages of this invention are described in or are apparent from the following detailed description of the systems and methods according to this invention.

BRIEF DESCRIPTION OF THE DRAWINGS

Various exemplary preferred embodiments of systems and methods according to this invention will be described in detail, with reference to the following figures, wherein.

DETAILED DESCRIPTION OF EXEMPLARY EMBODIMENTS

Figure 1:
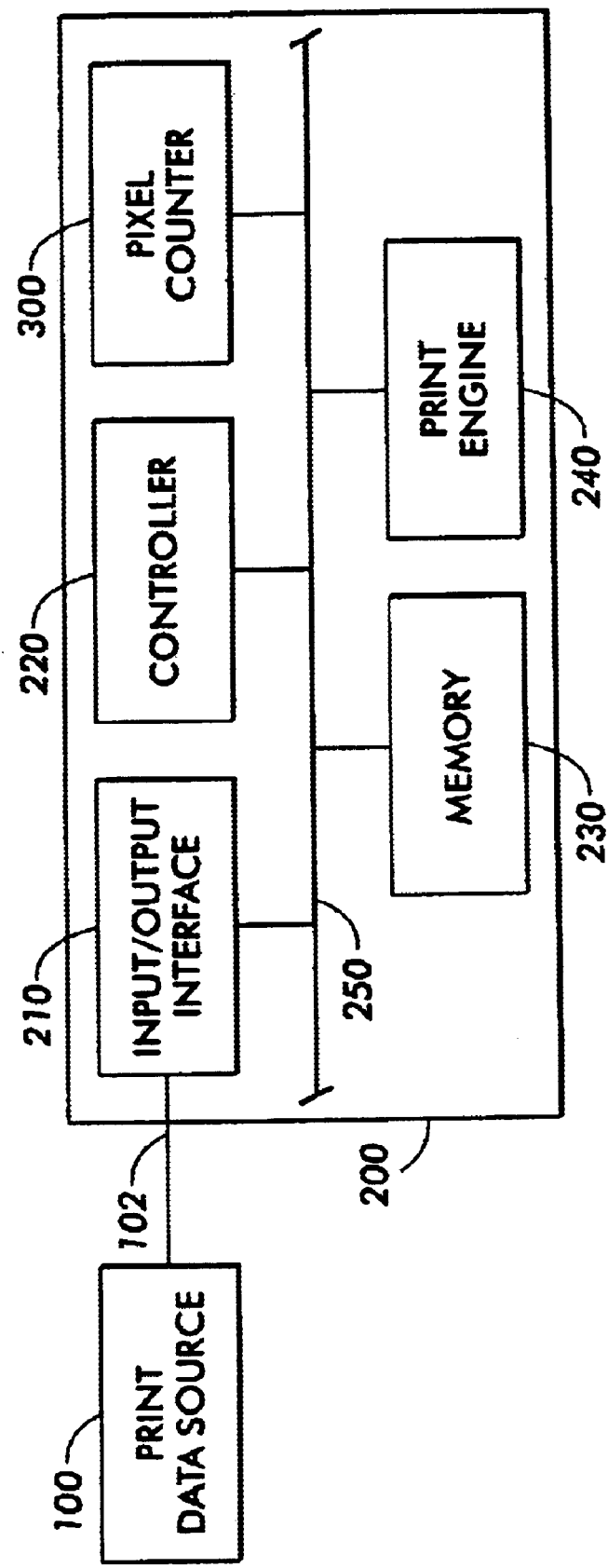
FIG. 1 is a block diagram of one exemplary embodiment of a pixel counting system according to this invention.

FIG. 1 shows a printing system 200, coupled to a print data source 100, that receives print data from the print data source 100 over a communication link 102. The printing system 200 includes a central bus 250 that interconnects an input/output interface 210, a controller 220, a memory 230, a pixel counter 300, and a print engine 240. The print data is received by the input/output interface 210 and sent via the bus 250 to the memory 230 under the control of controller 220. The controller 220 interprets and distributes the print data via the bus 250 to the memory 230 and/or to the print engine 240.

In general, the print data source 100 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the print data source 100 may be a scanner, or a data carrier such as a magnetic storage disk, CD-ROM or the like, or a host computer, that contains scanned image data. Thus, the print data source 100 can be any known or later developed source that is capable of providing print data to the input/output interface 210 of the print system 200.

The print data can include various components, such as control data and image data. The control data includes instructions that direct the print system 200, including the print engine 240, to perform various tasks that are required to print an image, such as paper feed, carriage return, print head positioning, or the like. The image data is the data that instructs the print head to mark the pixels of an image, such as, for example, to eject one drop from an ink jet print head onto an image recording medium. The print data received from the print data source 100 can include both control data and image data and can be compressed and/or encrypted in various formats.

Accordingly, while the print data is sent from the I/O interface 210 to the memory 230 via the bus 250, the controller 220 can separate into the control data and the image print data, respectively. Additionally, and if necessary, the controller 220 can decompress and/or decrypt the print data. Subsequently, the controller 220 directs the control data and the image data to appropriate portions of the memory 230.

The control data can include data pertaining to a data compression method, print method (direction, speed, number of passes), print quality (generally a combination of direction, speed, and number of passes), font data, text characters, and the like.

The image data is directed via the bus 250, to the memory 230, where the image data is stored until sufficient data is present to efficiently begin printing the image on the recording medium. When image data is sent to the memory from the print data source 100, the controller 220 simultaneously instructs the pixel counter 300 to begin monitoring the image data traveling on the bus 250. By instructing the pixel counter 300 when to begin monitoring the bus 250 for image data, the pixel counter 300 can separate the image data from all other types of data, such as the control data, traveling on the bus 250. Therefore, the pixel counter 300 can selectively read only the image data from the bus 250 while the print data is being sent to the memory 230.

The image data is sent over the bus 250 from the controller 220 to the memory 230. In one embodiment, high bits (1) are used to represent a single active pixel of the complete image. An active pixel can represent, for example, a single spot of ink from an ink jet printer. Conversely, low bits (0) are used to represent a nonactive pixel, such as a blank pixel of the complete image.

As the image data is sent to the memory 230 via the bus 250, the pixel counter 300 counts the number of active pixels in the image data. To accomplish this, the pixel counter 300 divides the image data into rows of pixels, and then further divides each row into columns. By dividing the image data into rows and columns, the number of active pixels in a specific portion of the image data can be determined. The location of active pixels within the image can be helpful in generating the desired print quality and speed. In particular, large areas of high ink coverage stress various subsystem. The drying time of large high-coverage areas is much longer than areas of low ink coverage, therefore, knowledge of the existence of a high coverage area (of significant size) can be used to slow printing to allow extra drying time. This avoids smear in the output tray. Other affected systems include the ink supply ducting, the heat dissipation subsystem, and the electrical power supply and distribution systems. Countermeasures often include slowing down by adjustment to the carriage speed, pausing between passes of the carriage, pausing at the end of a page and printing in multiple partially inked passes. Other countermeasures exist depending on the particulars of the print head design and function.

Figure 2:
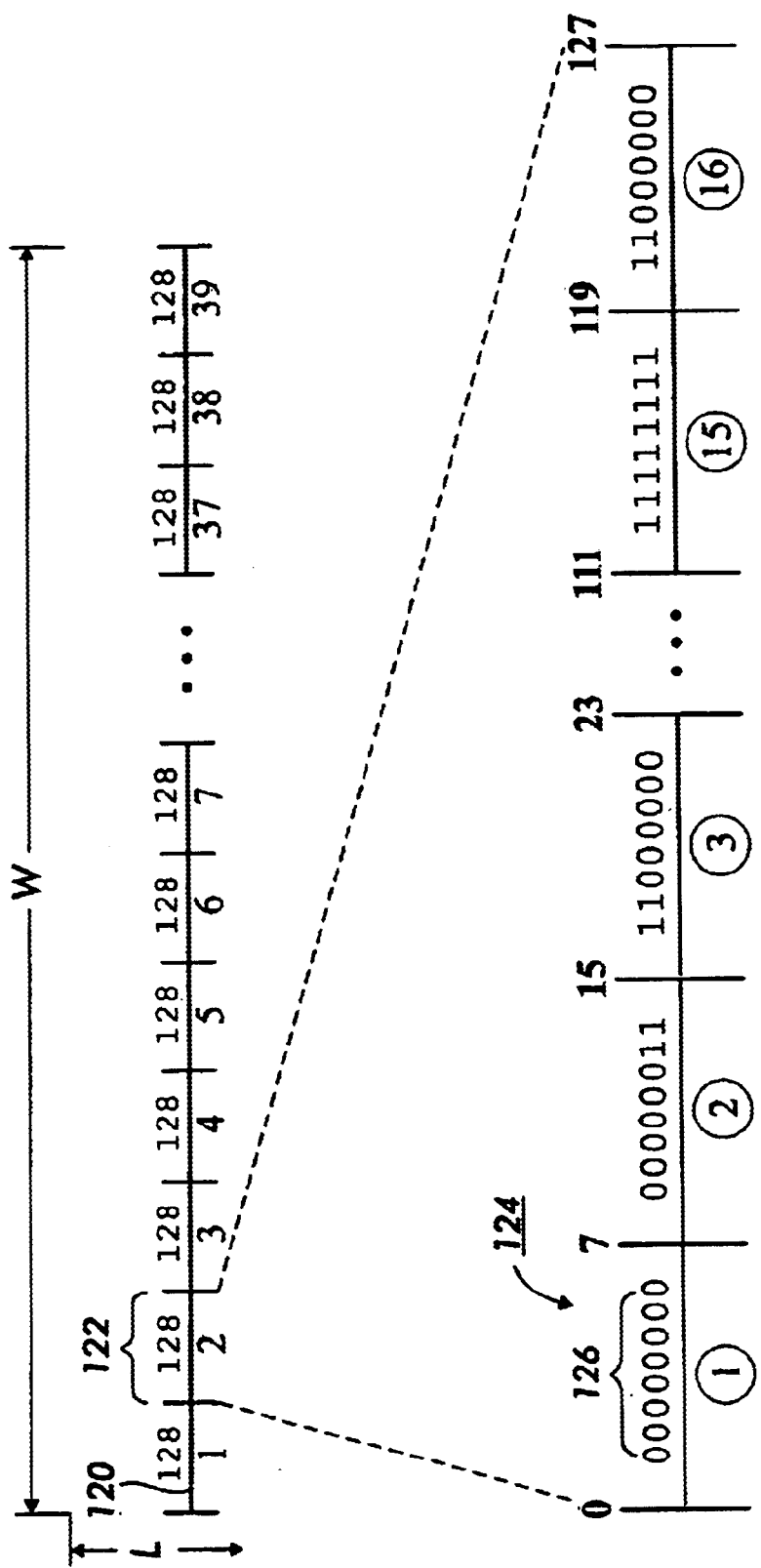
FIG. 2 is an exemplary diagram of the organization of image data, according to this invention.

FIG. 2 illustrates how the image data is divided into a plurality of "scan lines" 120. For example, a scan line can be a single row of pixels which extend horizontally across the entire image width W. However, it should be understood that a "scan line" 120 can include any number of configurations, such as a plurality of rows of pixels or a plurality of columns of pixels. To form an image, numerous "scan lines" 120 are consecutively positioned adjacent one another in a direction of a length L of the image as the image is printed.

In this example, the image width W is 8.32 inches, which translates into a scan line 120 having 4,992 pixels at 600 dpi. The scan line 120 is further divided into a plurality of frames 122, where each frame 122 is 128 pixels wide. Accordingly, this 4992-pixel-long scan line 120 is divided into 39 such frames 122.

The actual image data, which represents the individual pixels can be 8, 16, or 32 bits long. For example, in FIG. 2, the frame 122 is divided using bytes, or 8-bit data blocks 124. The individual pixels of the 8-bit blocks 124 are represented by a series of "1"s and "0"s, 126, with the "1"s representing active pixels and the "0"s representing inactive pixels. Accordingly, each frame 122 comprises of 16 such 8-bit blocks 124. It should be understood that any combination of data sizes can be used to fill a frame 122 (i.e., 8 16-bit blocks, 4 32-bit blocks, 4 16-bit blocks with 2 32-bit blocks).

Figure 3:
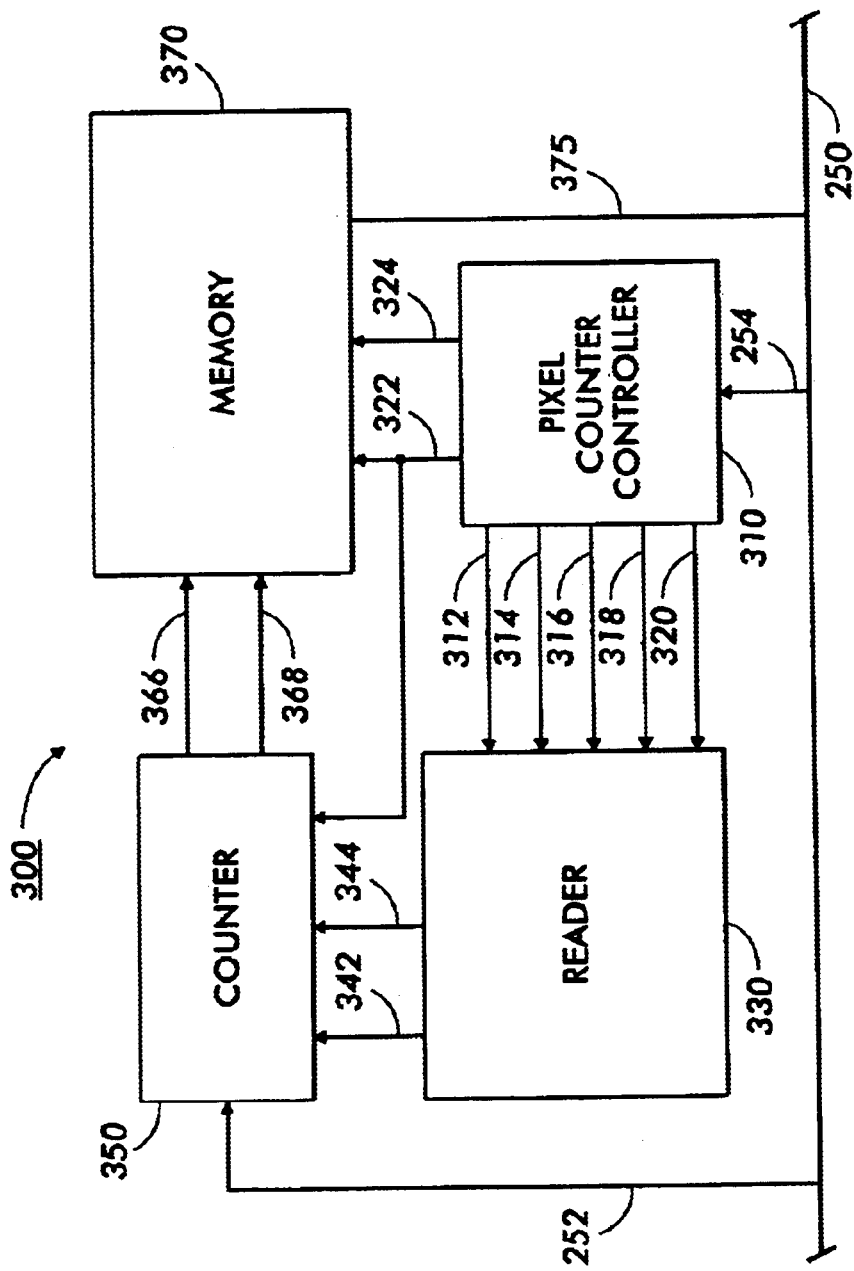
FIG. 3 is a block diagram of one exemplary embodiment of the pixel counter circuit of FIG. 1.

FIG. 3 is a block diagram showing in greater detail one exemplary embodiment of the pixel counter 300. As shown in FIG. 3, this exemplary embodiment of the pixel counter 300 includes a pixel counter controller 310, a reader 330, a counter 350, and a memory 370. As shown in FIG. 3, the pixel counter controller 310 is coupled to the bus 250 by a signal line 254. The pixel counter controller 310 receives instructions addressed to the pixel counter 300 from the controller 220. When the controller 220 transmits image data to the memory 230, the controller 220 sends a count command to the pixel counter controller 310 over the bus 250. The count command identifies a portion of the image data by the address locations of that portion of the image data on the bus 250 and instructs the pixel counter controller 310 to read the image data from the bus 250 during the transmission.

Upon receiving the count command from the controller 220, the pixel counter controller 310 instructs the reader 330 to begin reading. In particular, the pixel count controller 310 sends the reader 330 a beginning address and an ending address of the portion of the image data on the bus 250, along with an enable signal and the size of the image data to be read. The beginning address is the first address location of the portion of the image data as the image data travels on the bus 250. The beginning address is sent over a signal line 312 from the pixel counter controller 310 to the reader 330.

In a similar manner, the pixel counter controller 310 transmits to the reader 330 the ending address of the image data. The ending address is the last location of the image data on the bus 250. The ending address is sent to the reader 330 over a signal line 314. The enable signal is sent to the reader 330 from the pixel counter controller 310 over a signal line 316. The enable signal activates the reader 330 to begin reading data from the bus 250 over the signal line 252. The current address of the data on the bus 250 is sent to the reader 330 over a signal line 318. Additionally, the pixel counter controller 310 sends the data size to the reader 330 on a signal line 320.

In response to the inputs from the pixel counter controller 310, the reader 330 determines whether the current address present on the bus 250 is within the range of the beginning and ending addresses. If the current address is within the range, and the reader 330 is enabled, the reader 330 outputs an enable signal to the counter 350 over the signal line 342. The counter 350 also receives image data size signal from the reader 330 over a signal line 344. The counter 350 receives the image data over the signal line 252. Additionally, the counter 350 receives an output enable signal from the pixel counter controller 310 over the signal line 322. The output enable signal line 322 is enabled by the controller 310 when the count values are read from memory. Logic within the counter 350 uses the output enable signal line 322 to allow a partial frame accumulation.

When the counter 350 is enabled, the counter 350 counts the active pixels present in the image data that is received over the signal line 252. The count is then transferred to the memory 370 over a signal line 366. Additionally, the counter 350 transfers a write enable signal to the memory 370 over a signal line 368.

When the memory 370 and the counter 350 receive the output enable signal from the pixel counter controller 310 over the signal line 322, the counter 350 will send any partial frames to the memory 370. The memory 370 will take advantage of the 32-bit bus 375 and make the first 4 8-bit count values available on the bus 375. On each subsequent output enable signal given by the pixel count controller 310 over signal line 322 the next 4 8-bit count values can be made available on the bus 375.

The pixel counter controller 310 activates the reader 330 to begin reading or snooping from the bus 250 using the enable signal 316. Additionally, when the reader 330 determines that the data to be read from the bus 250 is image data, the reader 330 sets an enable signal high and sends the enable signal across the enable signal line 342. Additionally, the reader 330 sends the 3-bit data size 344 to the counter 350 based on the 4-bit data size obtained from the pixel counter controller 310.

Figure 4:
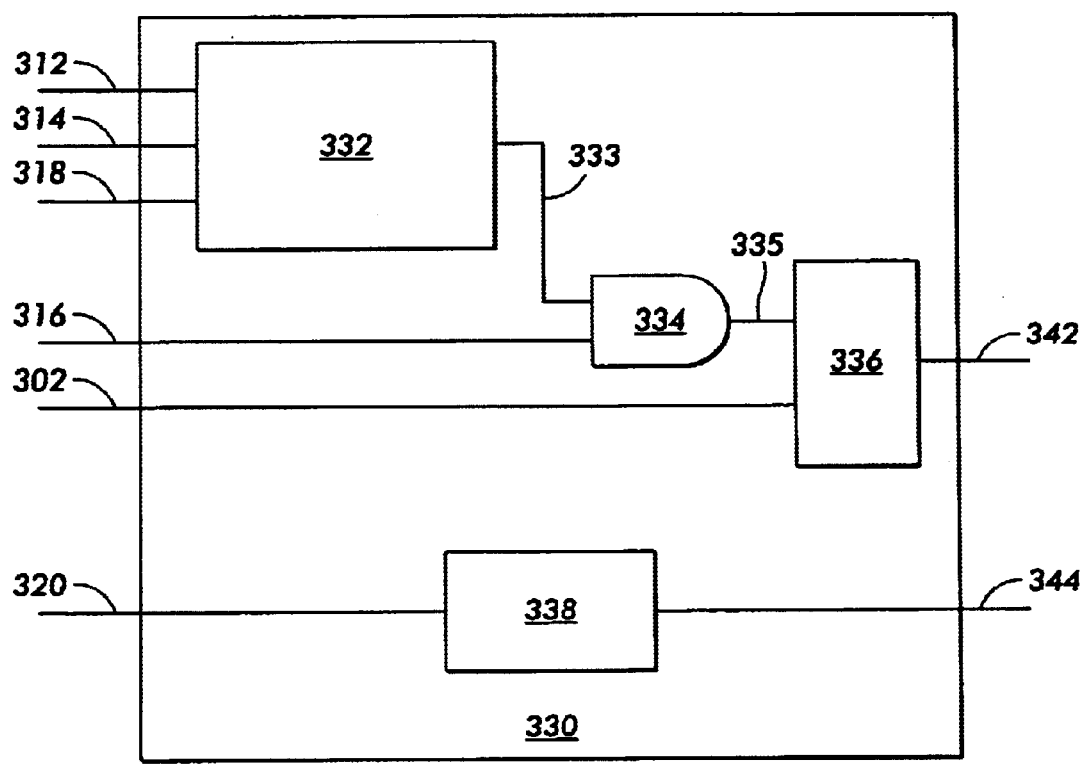
FIG. 4 is a block diagram of one exemplary embodiment of the CPU bus reader of FIG. 3.

FIG. 4 is a block diagram showing in greater detail one exemplary embodiment of the reader 330 according to this invention. As shown in FIG. 4, the beginning and ending address signals of the image data are supplied from the pixel count controller 310 over the signal lines 312 and 314, respectively, to a comparator 332 of the reader 330. The current address of the data on the bus 250 is input over the signal line 318, which is also connected to the comparator 332. The comparator 332 determines if the current address is within the range of the beginning and ending addresses.

If the value of the current address is within the range of the beginning and ending addresses, then the current address is image data and the comparator 332 outputs a high signal on the signal line 333. Conversely, if the current address does not fall within the range defined by the beginning and ending addresses, then the print data is not image data. Accordingly, the comparator 332 outputs a low signal on signal line 333. The output signal from the comparator 332 is transmitted on the signal line 333 to an AND gate 334.

The signal line 316 carries the enable signal from the pixel count controller 310 and is coupled to the AND gate 334. The enable signal is either high (enabled) or low (non-enabled) in response to the instructions from the controller 220.

In response to receiving a high signal output from the comparator 332 and a high enable signal on the signal line 316, the AND gate 334 outputs a high signal to the logic block 336 over a signal line 335. Conversely, if either input of the AND gate 334 is low, then the AND gate 334 will output a low signal on the signal line 335 to the logic block 336.

The logic block 336 receives the output of the AND gate 334 and a clock signal, which is transmitted over a signal line 302. The clock signal is a standard clock signal from the pixel counter controller 310, the system controller 220 or any general system clock. The clock signal is used to synchronize the elements of the pixel controller 300.

The logic block 336 may include a D-flip-flop, wherein the output of the AND gate 334 on signal line 335 is connected with the D input of the D-flip-flop. Additionally, the logic block 336 receives the input from the system clock on the signal line 302. In this example, in response to receiving a rising edge on the clock signal, the D-flip-flop outputs, on the Q output, the signal received over the signal line 335 at the D input of the D-flip-flop. The Q output of the D-flip-flop is then transmitted to the counter 350 over the signal line 342 as the enable signal from the reader 330.

The data size from the pixel counter controller 310 is supplied over the signal line 320 to a logic block 338. The data size represents the size or width of the data (i.e., 8, 16 or 32 bits) and is in a 4-bit format. The logic block 338 receives the data size signal over signal line 320 and converts the data size from the 4-bit format into a 3-bit format which is subsequently used by the counter 350 for ease of conversion into an integer. The 3-bit format data size is then output over the signal line 344 to the counter 350.

Figure 5:
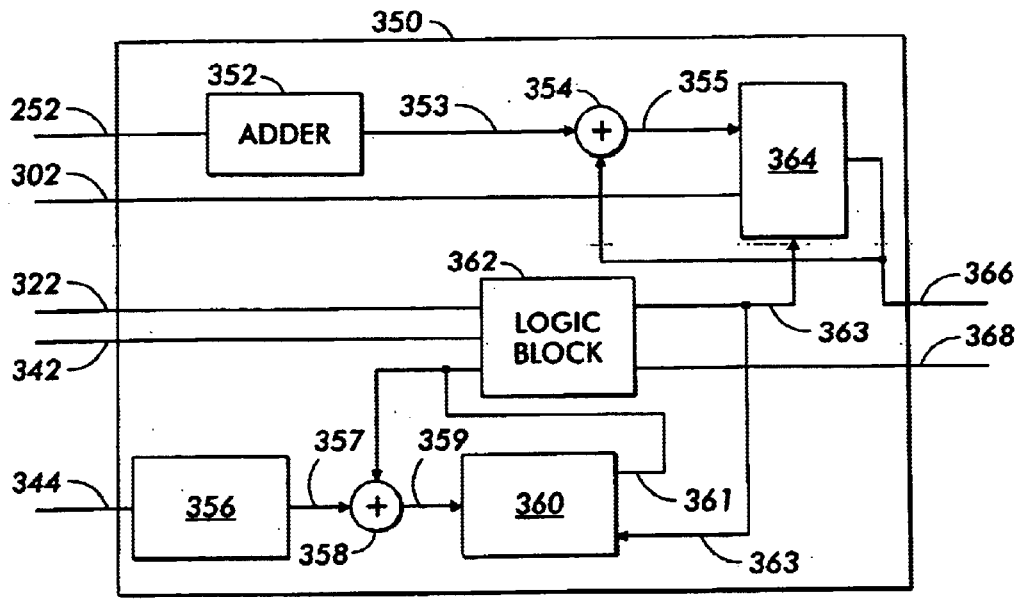
FIG. 5 is a block diagram of one exemplary embodiment of the pixel counter of FIG. 3.

FIG. 5 is a block diagram showing in greater detail one exemplary embodiment of the counter 350 according to this invention. Image data is input into the counter 350 on the signal line 252 and is subsequently added in an adder 352. The adder 352 sums the "on" or logic "1" bits of the data that indicate an active pixel to be printed. The adder 352 outputs a count of the "on" bits of the data as an 8-bit value on a signal line 353 to a summing circuit 354.

The 8-bit count value on the signal line 353 is input into the summing circuit 354 and the count value is added by the summing circuit 354 to the current value on the signal line 366 output from a first accumulator register 364. The input value is not input by the first accumulator register 364 until the first accumulator register 364 receives a clock pulse over the signal line 302. Upon receiving the clock pulse, the input on the signal line 355 is latched by the first accumulation register 364 and output on the signal line 366. In this manner, the next count value from the summing circuit 354 is added to the output of the first accumulator register 364. Thus, the output of the first accumulator register 364 output on the signal line 366 is a count of the active pixels.

The 3-bit format data size signal from the reader 330 is input into the counter 350 on the signal line 344. The 3-bit data size is converted to an integer by the logic block 356 and output to a summing circuit 358 over a signal line 357. The summing circuit 358 adds the integer data size received over the signal line 357 to a running total integer data size value received over a signal line 361 from a second accumulator register 360. That is, the second accumulator maintains the running total integer data size to the previous size of the data. The output from the second accumulation register 360 on the signal line 361 represents a count of the bits that have been read. The signal line 361 is also connected to a logic block 362.

The enable signal from reader 330 on the signal line 342 is also input to the logic block 362. Similarly, the output enable signal output from the pixel counter controller 310 on the signal line 322 is also input to the logic block 362.

In response to these inputs, the logic block 362 outputs an enable signal on a signal line 363 to the first and second accumulation registers 360 and 364 as an enable signal. That is, when the enable signal on the signal line 363 is high, the first and second accumulation registers 360 and 364 are provided with valid image data, and therefore latch the running totals of the number of high pixels and the integer data sizes from the summing circuits 354 and 358, respectively.

In operation, the second accumulation register 360 determines when a 128-pixel-long frame 204 has been counted by the counter 350. As the data size information is input via the signal line 344 and converted into an integer by the logic block 356, the second accumulation register 360 stores the string of image data sizes added by the summing circuit 358. For example, if an 8-bit string of image data is initially read by the pixel counter 300, then the value of the second accumulation register 360 is initially 8. Later, when a 16-bit value is read, the new value of the second accumulation register 360 becomes 24. The output of the second accumulation register 360 represents a count of the bits which have been read and is sent to the logic block 362 over the signal line 361.

Once the value in the second accumulation register 360 reaches 128, or more generally, the number of pixels in a frame 122, the logic block 362 transmits a memory write over the signal line 368. This command is subsequently used to control the memory 370 and is further described with reference to FIG. 6. Even with a value smaller than 128 in the second accumulation register 360, the output enable signal 342, can enable a memory write over the signal line 368 if there is a valid count in the first accumulator register 364 which has not yet been stored in memory 370. Also, completion of the command can clear to zero the first and second accumulation registers (364, 360) so that they may count from zero at the start of each new frame 122.

Figure 6:
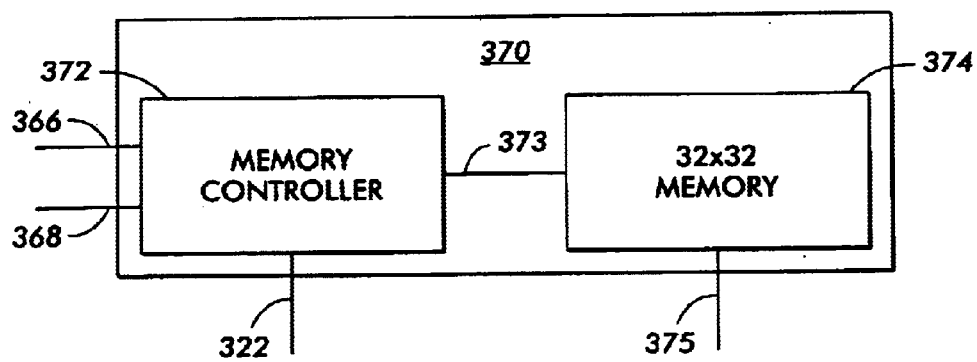
FIG. 6 is a block diagram of one exemplary embodiment of the memory of FIG. 3.

FIG. 6 is a block diagram showing in greater detail one exemplary embodiment of the memory 370 according to this invention. As described above, the counter 350 outputs a count of active pixels on the signal line 366 and a memory write signal on the signal line 368. The active pixel count changes as the counter 350 receives image data from the reader 330. The memory controller 372 holds the current active pixel count until the memory controller 372 receives a memory write signal from the counter 350 to write the active pixel count value to the 32×32 memory 374. When the memory controller 372 receives a write enable signal on the signal line 368, the memory controller 372 writes the active pixel count value, transmitted over a signal line 373, into the next available memory position in the memory 374.

As described above, the write enable signal is sent from the logic block 362 of the counter 350 after the counter 350 has examined an entire frame 122 of image data, i.e., 128 pixels. Accordingly, the active pixel count value is a count of the number of active pixels in 128 pixels of the image data. When the memory controller 372 receives an enable signal on the signal line 368, the memory controller 372 writes the active pixel count value to the 32×32 memory 374 over the signal line 373.

The 32×32 memory 374 is divided into 128 8-bit cells. Accordingly, in this configuration, the memory 374 can store a scan line 202 that is 16,384 pixels in length (128 (8-bit cells)×128 (pixels)=16,384(pixels)). In other words, the scan line 202 can be 27.3 inches long if printed at 600 spi.

The use of a 32×32 memory allows all the 128 8-bit count values to read in 32 register access. The memory controller 372 packs four count values in a single 32-bit memory location. When the output enable signal 322 is given from the pixel counter controller 310, the memory controller 372 makes the first four count value available on the 32-bit signal bus 375. When subsequent output enable signals 322 are issued, the memory controller 372 will make the next set of four count values available on the 32-bit bus 375.

Figure 7:
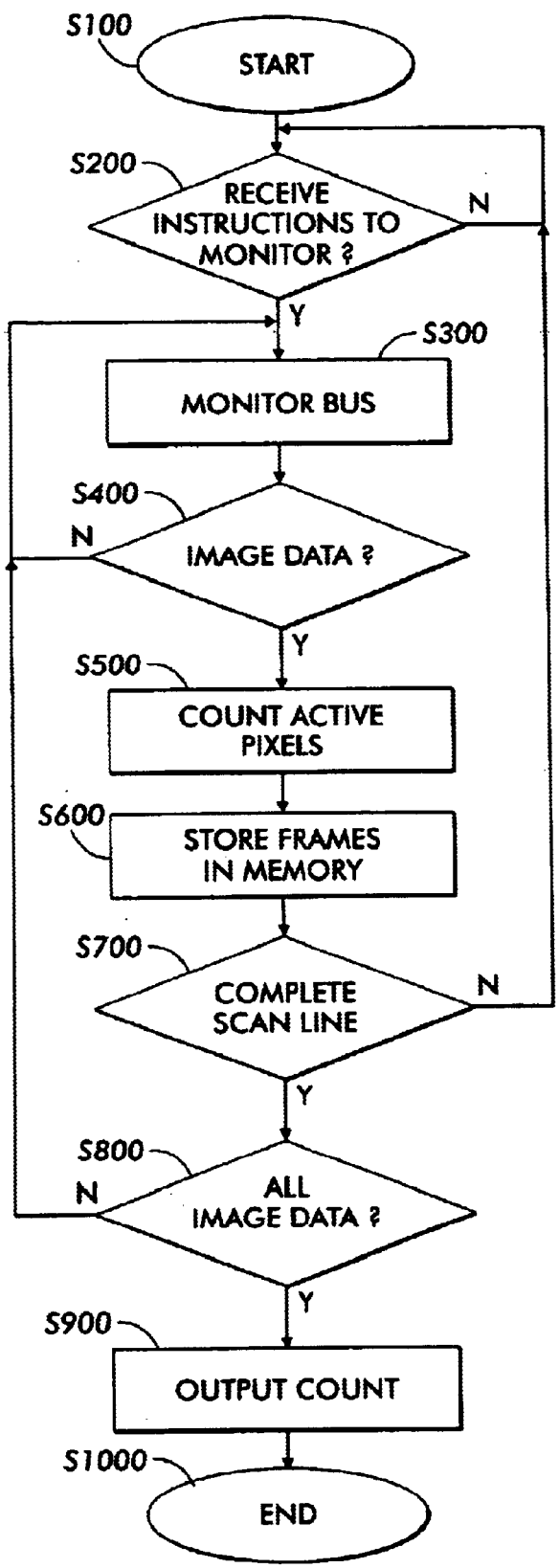
FIG. 7 is a flowchart outlining one exemplary embodiment of the methods for counting pixels according to this invention.

FIG. 7 is a flowchart outlining one exemplary embodiment of a method for counting pixels according to this invention. Beginning in step S100, control continues to step S200, where a pixel counter waits until a pixel counter receives an instruction to begin monitoring a data bus for image data. Until such instructions are received, control returns to step S200.

Once instructions are received, control continues to step S300, where the pixel counter begins to monitor the bus for image data. Next, in step S400, as the print data on the bus is monitored, the print data is checked to determine if the print data on the bus contains image data. If the print data is image data, control continues to step S500. Otherwise, control returns to step S300.

In step S500, the active pixels present in the image data are counted. Next, in step S600, the count of the active pixels is stored in a memory. Then, in step S700, a determination is made whether the image data corresponding to a complete scan line has been counted. If not, control again returns to step S300. Otherwise, control continues to step S800.

In step S800, a determination is made whether all of the image data has been snooped and counted. If not, control returns to step S200. Otherwise, control continues to step S900, where the pixel count is output. For example the pixel counted may be output to a processor where the count data can be used to implement a print strategy. Control then continues to step S1000, where the method ends.

Figure 8:
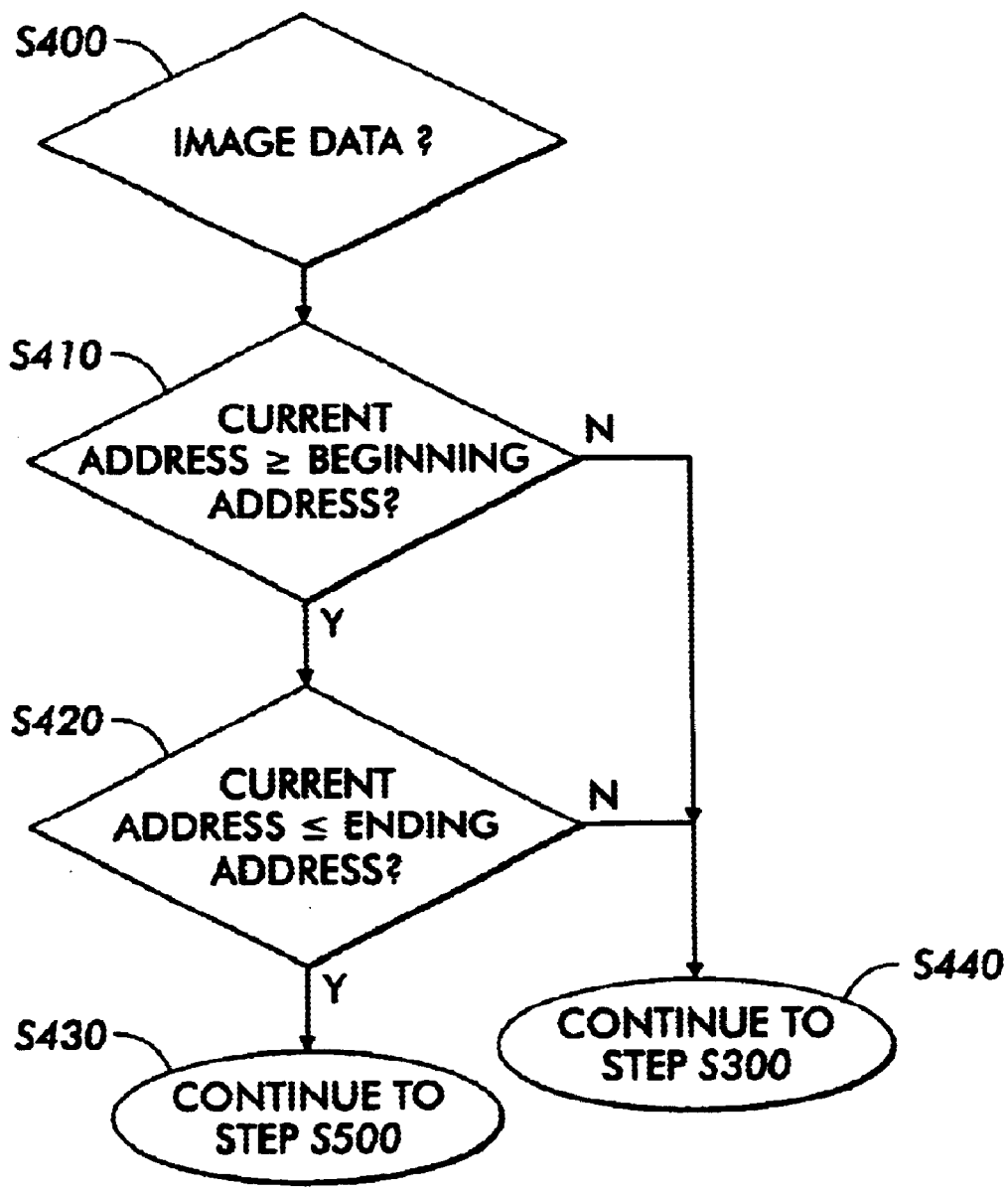
FIG. 8 is a flow chart further outlining a step of the flow chart in FIG. 7.

FIG. 8 is a flowchart outlining in greater detail step S400 of FIG. 7. Control begins at step S400 and continues to step S410, where the pixel counter determines whether a current address of the data entering the pixel counter from the bus is greater or equal to a beginning address of the image data being sent on a bus. If the current address is greater than the beginning address then control continues to step S420. Otherwise, control jumps to step S440.

In step S420, the pixel counter determines whether a current address of the data entering the pixel counter from the bus is less or equal to an ending address of the image data being sent on the bus. If the current address is before the ending address, then control continues to step S430, where control continues to step S500. Otherwise, control jumps to step S440. In step S440, control returns to step S300.

The pixel count data can be used by a processor to develop a print strategy which maximizes the use of limited print resources. For example, some of the limited print resources include drying time, paper cockle due to humidity and ink loading, ink flow resistance to and in the head, head heat dissipation and electrical supply limitations.

While the systems and methods of this invention have been described in conjunction with the specific embodiments outlined above, it is evident that many alternatives, modifications and variations will be apparent to the those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. An apparatus that counts pixels in regions of interest within print data, the print data including image data having active and inactive pixels, the apparatus comprising:
   a pixel counter controller coupled to a data bus;
   a pixel counter coupled to the data bus, that generates a pixel count based on the active pixels of the image data;
   a reader, coupled to the pixel counter controller and the pixel counter, that selectively enables the pixel counter to read the image data from the print data on the data bus; and
   a memory, coupled to the pixel counter controller, that stores the pixel count.

2. The apparatus according to claim 1, wherein the reader selectively enables the pixel counter based on:
   a beginning address of the image data; and
   an ending address of the image data.

3. The apparatus according to claim 1, wherein the image data is grouped into a scan line, the scan line comprising a single row of pixels extending across an image.

4. The apparatus according to claim 3, wherein each scan line is divided into a plurality of frames, each of the frames comprising a predetermined number of consecutive pixels of the scan line.

5. The apparatus according to claim 4, wherein the plurality of frames are further divided into a plurality of pixel blocks, each of the pixel blocks comprising a predetermined number consecutive pixels of a frame.

6. The apparatus according to claim 4, wherein:
the pixel counter generates the pixel count based on the pixel count in each of the frame; and
the memory separately stores the active count of each frame.

7. The apparatus according to claim 3, wherein the pixel counter generates the pixel count based on the active pixels of each of the scan lines.

8. The apparatus according to claim 1, wherein the pixel counter further comprises:
an adder that receives image data and counts the active pixels present in the image data;
a frame counter that measures the amount of image data being added by the adder and instructs the memory to read the active pixel count from the adder and store the read pixel count when a frame of image data has been counted.

9. A method for counting pixels in regions of interest within print data in a printer using an independent pixel counter connected to a data bus, the print data including image data having active and inactive pixels, the method comprising:
receiving a count command at the independent pixel counter;
selectively reading, in response to the count command, image data from the print data on the data bus;
generating in the independent pixel counter a pixel count based on the active bits of the read image data; and
outputting the pixel count from the independent pixel counter.

10. The method according to claim 9, wherein selectively reading the image data comprises selectively reading the image data from the data bus based on a beginning address, and an ending address of the image data.

11. The method according to claim 9, wherein the image data is grouped into a scan line, the scan line comprising a single row of pixels extending across a width of an image.

12. The method according to claim 11, wherein each scan line is divided into a plurality of frames, each of the frames comprising a predetermined number of consecutive pixels of the scan line.

13. The method according to claim 12, wherein the plurality of frames are further divided into a plurality of pixel blocks, each of the pixel blocks comprising a predetermined number of consecutive pixels of a frame.

14. The method according to claim 11, wherein generating the pixel count comprises generating the pixel count based on the pixel count in each of the frames, and separately storing the pixel count of each frame.

* * * * *